United States Patent
Sharma

(10) Patent No.: US 10,223,024 B2
(45) Date of Patent: Mar. 5, 2019

(54) STORAGE CONTROLLER FOR PROVISIONING STORAGE SERVICES FOR AN APPLICATION BASED UPON APPLICATION-SPECIFIC REQUIREMENTS

(71) Applicant: Oracle International Corporation, Redwood Shores, CA (US)

(72) Inventor: Pratik Sharma, Mumbai (IN)

(73) Assignee: Oracle International Corporation, Redwood Shores, CA (US)

(*) Notice: Subject to any disclaimer, the term of this patent is extended or adjusted under 35 U.S.C. 154(b) by 106 days.

(21) Appl. No.: 15/291,506

(22) Filed: Oct. 12, 2016

(65) Prior Publication Data
US 2018/0101324 A1    Apr. 12, 2018

(51) Int. Cl.
G06F 3/06 (2006.01)
G06F 17/30 (2006.01)
G06F 9/455 (2018.01)

(52) U.S. Cl.
CPC ............ *G06F 3/0644* (2013.01); *G06F 3/061* (2013.01); *G06F 3/0604* (2013.01); *G06F 3/067* (2013.01); *G06F 3/0608* (2013.01); *G06F 3/0664* (2013.01); *G06F 9/45533* (2013.01); *G06F 17/30212* (2013.01); *G06F 17/30233* (2013.01); *G06F 17/30241* (2013.01); *G06F 2009/45583* (2013.01)

(58) Field of Classification Search
CPC ...... G06F 3/0644; G06F 3/0608; G06F 3/061; G06F 3/065; G06F 3/0652; G06F 3/0664; G06F 3/067; G06F 9/45558; G06F 12/0802; G06F 17/30233; G06F 17/30212; G06F 17/30241; G06F 2009/45583;

(Continued)

(56) References Cited

U.S. PATENT DOCUMENTS 8,793,379 B2 * 7/2014 Upadhya ............... G06F 3/0605
                                                       709/226
9,699,017 B1 * 7/2017 Gupta ............... H04L 29/08549

(Continued)

OTHER PUBLICATIONS

Nutanix Solution Note, "Data Protection and Disaster Recovery Version 1.0," Nutanix, Inc., Apr. 2015, 14 pages. http://go.nutanix.com/rs/nutanix/images/Nutanix%20Data%20Protection%20and%20Disaster%20Recovery%20Tech%20Note_final.pdf.

(Continued)

*Primary Examiner* — Eric Cardwell
(74) *Attorney, Agent, or Firm* — Kilpatrick Townsend & Stockton LLP

(57) ABSTRACT

An infrastructure is described that enables an application's storage-related requirements to be declaratively specified and storage services to be provided for that application in accordance with the specified storage requirements. A centralized storage controller system is provided that receives application storage profile information for an application, where the application storage profile information identifies that application's storage-related requirements. The storage controller system then selects one or more virtual machines for servicing that application's storage needs. The selected one or more storage virtual machines are those that can support, i.e., can provide or satisfy, the application's storage requirements. During runtime, a storage request generated by the application is communicated to the one or more storage virtual machines, which then service the storage request in accordance with the application's specified storage-related requirements.

19 Claims, 7 Drawing Sheets

(58) Field of Classification Search
CPC ......... G06F 2212/152; G06F 2212/154; G06F 2212/401; G06F 2212/60
See application file for complete search history.

(56) References Cited

U.S. PATENT DOCUMENTS

| | | | | |
|---|---|---|---|---|
| 2009/0276771 | A1* | 11/2009 | Nickolov | G06F 9/4856 717/177 |
| 2013/0290470 | A1 | 10/2013 | CaraDonna et al. | |
| 2014/0130047 | A1* | 5/2014 | Wang | G06Q 10/00 718/1 |
| 2015/0263983 | A1 | 9/2015 | Brennan et al. | |

OTHER PUBLICATIONS

"NetApp Virtual Storage Console for VMware vSphere," datasheet NetApp, Inc., copyright 2015, 4 pages. http://www.netapp.com/in/media/ds-3057.pdf.

"Quality of Service—Sanbolic" Citrix Systems, Inc., copyright 1999-2015, downloaded from the internet Dec. 24, 2015, 9 pages. http://sanbolic.com/topic/quality-of-service/.

"Red Hat Virtual Storage Appliance for Amazon Web Services," copyright 2011, Red Hat, Inc., 3 pages. https://www.redhat.com/f/pdf/RH_Virtual_Storage_Appliance_8227717_1111_ma_web.pdf.

"Seven10 Shares Insight on Cloud-Based Storage Techniques," press release Seven10 Storage Software, LLC, Oct. 28, 2014, 3 pages. http://www.seven10storage.com/Press-Releases/seven10-shares-insight-on-cloud-based-storage-techniques.html.

"Tintri Vision," Tintri, Mountain View, CA., downloaded from the internet Dec. 24, 2015, 7 pages. https://www.tintri.com/content/vision.

Nayak et al. "Application Aware Storage Platform," Vmware Technical Journal Summer 2014, 25 pages. https://labs.vmware.com/vmtj/application-aware-storage-platform.

Sreegiriraju et al. *Application-Aware Storage for Dummies*, copyright 2014, 61 pages.

* cited by examiner

STORAGE CONTROLLER FOR PROVISIONING STORAGE SERVICES FOR AN APPLICATION BASED UPON APPLICATION-SPECIFIC REQUIREMENTS

BACKGROUND

The present disclosure relates generally to storage services. More particularly, an infrastructure is described that enables an application's storage-related requirements to be declaratively specified and for storage services to be provided to that application in accordance with the specified storage-related requirements.

The proliferation and popularity of data-intensive technologies such as cloud computing, big data analysis, mobile computing, etc., has led to a dramatic increase in the collection and storage of data. As a result, the demand for storage resources and associated storage-related services has increased exponentially. Today's storage solutions are unable to keep pace with this increasing demand. For example, in a typical cloud environment, the storage resources used by cloud applications can be spread and distributed across multiple locations. The applications themselves may be of different types and may have different storage requirements. Even though the applications may have different storage requirements, presently, storage services are provided to the applications in an application-agnostic manner that does not take into consideration the applications' specific requirements. Many times an application is burdened with making do and compromising with storage services available to the application without any consideration to what the application's needs are. This can have a detrimental impact on the performance of the application and leads to inefficiencies in the manner storage-related services are provided to applications.

BRIEF SUMMARY

The present disclosure relates generally to storage services. More particularly, an infrastructure is described that enables an application's storage-related requirements to be declaratively specified and for storage services to be provided to that application in accordance with the specified storage requirements. Storage-related services are customized for the application based upon the application's needs. The infrastructure can be implemented in various different environments including a cloud environment, on-premises environment, a hybrid environment, and the like. The infrastructure enables virtualizing of storage for applications based on requirements specified by the applications.

In certain embodiments, the infrastructure includes a centralized storage controller system for enabling and managing the provision of storage-related services to applications based upon the applications' storage-related requirements. The centralized storage controller system is configured to receive application storage profile information for an application, where the application storage profile information includes information about the application and also identifies that application's storage-related requirements. The storage controller system then generates a unique application identifier (application ID) for the application and selects, based upon the application storage profile information, one or more virtual machines (referred to as storage virtual machines) for servicing that application's storage needs. The selected one or more storage virtual machines include virtual machines that can support, i.e., can provide or satisfy, the application's storage requirements specified in the application storage profile information for the application. Information identifying the application ID and the selected one or more storage virtual machines is communicated from the storage controller system to a system (application system) that will execute the application. Information identifying the application ID and the application storage profile information is communicated from the storage controller system to each of the one or more selected storage virtual machines.

In certain embodiments, during runtime processing, the application may be executed by the application system and may generate a storage request, where the storage request includes the application ID assigned to the application by the storage controller system. The application system is configured to determine, based upon the application ID, a storage virtual machine preconfigured for servicing the application and is then configured to route the storage request to that storage virtual machine. The storage virtual machine receiving the storage request is able to determine the corresponding storage-related requirements associated with the application ID and service the storage request in accordance with those storage-related requirements. In this manner, storage services are provided to that application in accordance with that application's specified storage requirements.

In certain embodiments, the storage controller system provides a centralized system for enabling and managing storage-related services for multiple applications that may be distributed in a network environment. The set of storage virtual machines from which the storage controller system selects a storage virtual machine for servicing an application may also be distributed within the network environment. The storage controller system thus has a centralized view of storage-related requirements for different applications, the storage virtual machines available for servicing the applications and their capabilities, and which storage virtual machines are servicing which applications. This centralized view simplifies management of the overall infrastructure leads to lower the cost of operations.

In certain embodiments, a first computer system (e.g., storage controller system) may receive application storage profile information for an application, the application storage profile information identifying a set of storage-related requirements for the application. The first computer system may then generate an application identifier for the application. The first computer system may also identify, from a plurality of virtual machines, a first virtual machine that is capable of supporting the set of storage-related requirements identified in the application storage profile information. The first computer system may communicate the application identifier and information identifying the first virtual machine to a second computer system (e.g., a system on which the application will run) that is configured to execute the application for enabling the second computer system to communicate a storage request generated by the application to the first virtual machine The first computer system also communicates the application identifier and the application storage profile information to the first virtual machine for enabling the first virtual machine to service the storage request generated by the application. The first computer system may store information associating the application identifier with the application storage profile information and the identified virtual machine.

In certain embodiments, as part of the processing to identify the first virtual machine, the first computer system may determine that the set of storage-related requirements includes a first storage-related requirement identifying a particular type of storage device, and then determine that the first virtual machine is capable of supporting the particular type of storage device.

In yet another embodiment, as part of the processing to identify the first virtual machine, the first computer system may determine that the set of storage-related requirements includes one or more storage-related requirements, the one or more storage-related requirements identifying one or more storage-related features for the application. The first computer system may then determine that the first virtual machine is capable of supporting the one or more storage-related features. The one or more storage-related features may include a feature related to caching, replication, compression, deduplication, coalescing writes, an optimization for key-value pairs, an object-store optimization, or an optimization for a database.

In certain embodiment, the first computer system may be configured to determine a geographical location of the second computer system. In such an embodiment, as part of the processing to identify the first virtual machine, the first computer system may determine, from the plurality of virtual machines, multiple virtual machines that are capable of providing the set of storage-related requirements for the application, the multiple virtual machines including the first virtual machine. The first computer system may then determine a geographical location for each of the virtual machines in the multiple virtual machines, and then determine that, from among the multiple virtual machines, the first virtual machine is geographically closest to the geographical location of the second computer system.

In certain embodiments, the second computer system may execute the application by the second computer system. The application may generate a storage request, where the storage request includes the application identifier. The second computer system may then communicate the storage request to the first virtual machine. For example, the second computer system may communicate the storage request to a system executing the first virtual machine. Upon receiving the storage request, the first virtual machine may determine the set of storage-related requirements for the application using the application identifier in the storage request. The first virtual machine may then service the storage request according to the set of storage-related requirements for the application.

In certain embodiments, an application system may determine an application identifier included in a storage request generated by an application executed by the application system. The application system may then determine, based upon information received by the application system for the application prior to the storage request being generated, a first virtual machine corresponding to the application identifier. The application system may then communicate the storage request to the first virtual machine for servicing of the storage request by the first virtual machine according to a set of storage-related requirements specified for the application prior to the generation of the storage request. In certain embodiments, upon receiving the storage request from the application system, the first virtual machine may determine the set of storage-related requirements for the application using the application identifier in the storage request, and then service the storage request according to the set of storage-related requirements.

In some embodiments, the storage request may be received by an operating system executed by the application system. The operating system may then identify the application identifier from the storage request and determine the first virtual machine corresponding to the application identifier. The operating system on the application system may then cause the storage request to be routed to the first virtual machine.

In certain embodiments, a storage controller system is configured to generate the application identifier for the application and to select the first virtual machine for servicing the application based upon application storage profile information received by the storage controller system for the application, the application storage profile information identifying a set of storage-related requirements for the application. The first virtual machine is selected because it is capable of supporting the set of storage-related requirements identified in the application storage profile information. The storage controller system may then communicate the generated application identifier and information identifying the set of storage-related requirements for the application to the first virtual machine (or to a system executing the first virtual machine) prior to generation of storage request by the application. The storage controller system may also communicate the application identifier and information identifying the selected first virtual machine to the application system prior to generation of the storage request by the application.

The foregoing, together with other features and embodiments will become more apparent upon referring to the following specification, claims, and accompanying drawings.

DETAILED DESCRIPTION

Figure 1:
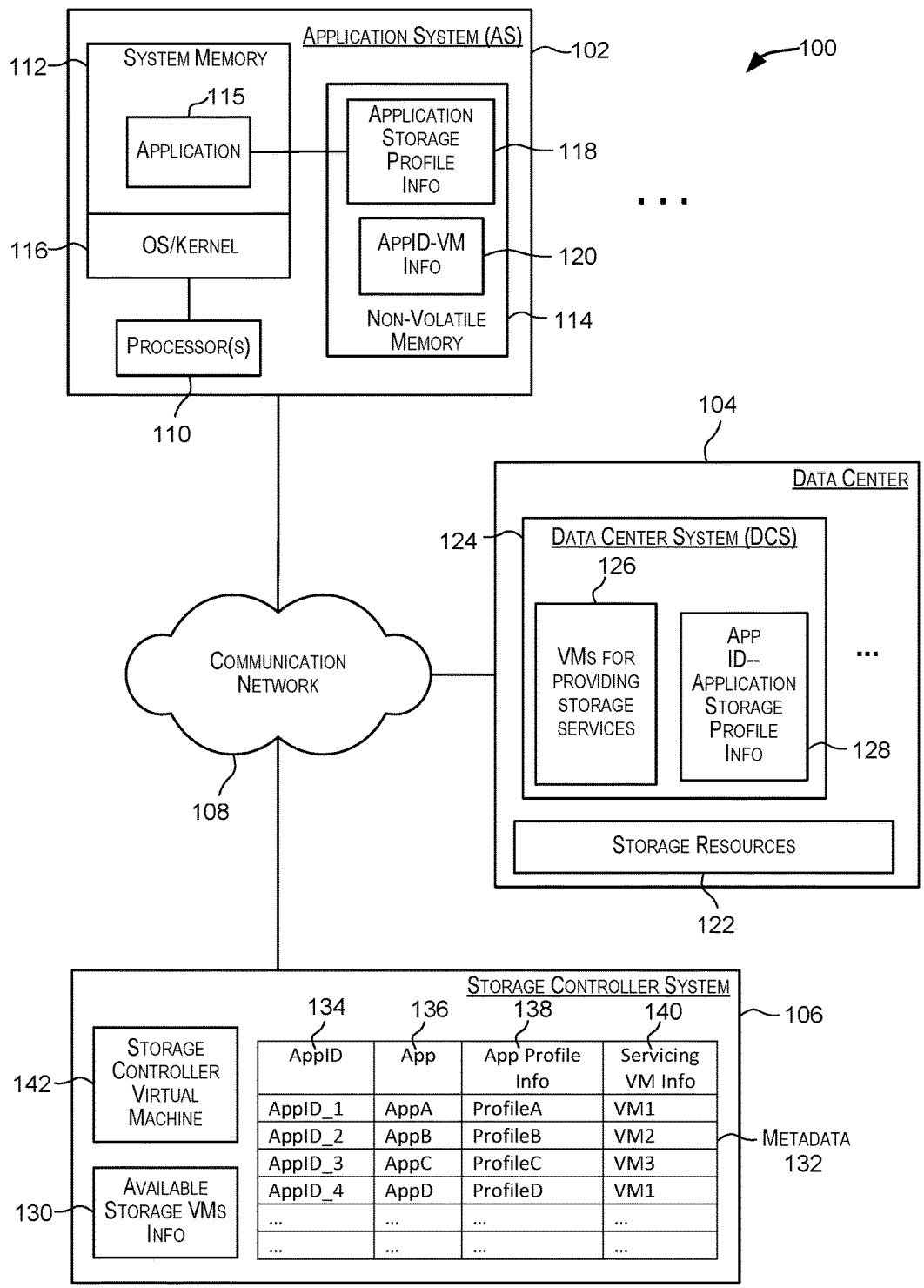
FIG. 1 is a simplified block diagram of a distributed environment incorporating an exemplary embodiment.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes an infrastructure that enables an application's storage-related requirements to be declaratively specified and storage services to be provided for that application in accordance with the specified storage requirements. Storage-related services are thus customized for the application based upon the application's needs. The infrastructure can be implemented in various different environments including a cloud environment, on-premises environment, a hybrid environment, and the like. The infrastructure enables virtualizing of storage for applications based on requirements specified by the applications.

In certain embodiments, the infrastructure includes a centralized storage controller for enabling and managing the provision of storage-related services to applications based upon the applications' storage-related requirements. The centralized storage controller system is configured to receive application storage profile information for an application, where the application storage profile information includes information about the application and also identifies that application's storage-related requirements. The storage controller system then generates a unique application identifier (application ID) for the application and selects, based upon the application storage profile information, one or more virtual machines (referred to as storage virtual machines) for servicing that application's storage needs. The selected one or more storage virtual machines include virtual machines that can support, i.e., can provide or satisfy, the application's storage requirements specified in the application storage profile information for the application. Information identifying the application ID and the selected one or more storage virtual machines is communicated from the storage controller system to a system (application system) that will execute the application. Information identifying the application ID and the application storage profile information is communicated from the storage controller system to each of the one or more selected storage virtual machines.

In certain embodiments, during runtime processing, the application may be executed by the application system and may generate a storage request, where the storage request includes the application ID assigned to the application by the storage controller system. The application system is configured to determine, based upon the application ID, a storage virtual machine preconfigured for servicing the application and is then configured to route the storage request to that storage virtual machine. The storage virtual machine receiving the storage request is able to determine the corresponding storage-related requirements associated with the application ID and service the storage request in accordance with those storage-related requirements. In this manner, storage services are provided to that application in accordance with that application's specified storage requirements.

For purposes of this application, a storage request is any request that involves a memory operation. For example, a storage request may correspond to a request to perform a memory read operation, a request to perform a memory write operation, a request to perform a memory read and write operation, a request to allocate memory, a request to deallocate or free memory, or other requests involving a memory operation. The memory implicated in a storage request can be a volatile memory or a non-volatile memory. Examples of memories include a cache, a hard disk, a floppy disk, flash memory, a solid-state drive or disk (SSD), a USB flash drive, a memory card, a memory stick, a tape cassette, a zip cassette, a computer hard drive, CDs, DVDs, Network-attached storage (NAS), memory storage provided via a Storage Area Network (SAN), and the like. Examples of storage requests include without limitation, a request to update a file stored in memory, a request to read information from a file stored in memory, a request to update or read a database record, a request to update or read an object stored in an object store, a request to update data part (value) of a key-value store, and the like.

FIG. 1 is a simplified block diagram of a distributed environment 100 incorporating an exemplary embodiment. Distributed environment 100 may comprise multiple systems communicatively coupled to each other via one or more communication networks 108. The systems in FIG. 1 include one or more application systems 102, one or more data centers 104, and a storage controller system 106 communicatively coupled to each other via communication network 108. Distributed environment 100 depicted in FIG. 1 is merely an example and is not intended to unduly limit the scope of inventive embodiments recited in the claims. One of ordinary skill in the art would recognize many possible variations, alternatives, and modifications. For example, in some implementations, distributed environment 100 may have more or fewer systems than those shown in FIG. 1, may combine two or more systems, or may have a different configuration or arrangement of systems.

Communication network 108 facilitates communications between the various systems depicted in FIG. 1. Communication network 108 can be of various types and can include one or more communication networks. Examples of communication network 108 include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk®, Bluetooth®, and other protocols. In general, communication network 108 may include any infrastructure that facilitates communications between the various systems depicted in FIG. 1.

An application system 102 is a system on which an application executes. An application executed by an application system may generate one or more storage requests, which may be handled in accordance with the teachings of this disclosure. Application system 102 may execute multiple applications, some of which may be executed in parallel. In some instances, an application that is to be executed by application system 102 may also be deployed to or installed on application system 102.

An application system 102 may comprise one or more processors 110 and memory resources. Processors 110 may include single or multicore processors. Processors 110 may include general purpose microprocessors such as ones provided by Intel®, AMD®, ARM®, Freescale Semiconductor, Inc., and the like, that operate under the control of software stored in associated memory. An application executed by application system 102 may be executed one or more processors 110.

Memory resources of application system 102 may include a system memory 112 and non-volatile memory 114. System memory 112 may provide memory resources for processors 110. System memory 112 is typically a form of volatile random access memory (RAM) (e.g., dynamic random access memory (DRAM), Synchronous DRAM (SDRAM), Double Data Rate SDRAM (DDR SDRAM)). Information related to an operating system and applications or processes executed by processors 110 may be stored in system memory 112. For example, during runtime, as depicted in FIG. 1, an operating system/kernel 116 may be loaded into system memory 112. Additionally, during runtime, data related to one or more applications executed by application system 102 may be loaded into system memory 112. For example, as depicted in FIG. 1, application 115 being executed by application system 102 is loaded into system memory 112 and executed by processor 110. Application system 102 may be capable of executing multiple applications in parallel.

Non-volatile memory 114 may be used to store data that is to be persisted. Non-volatile memory 114 may come in different forms such as a hard disk, a floppy disk, flash memory, a solid-state drive or disk (SSD), a USB flash drive, a memory card, a memory stick, a tape cassette, a zip cassette, a computer hard drive, CDs, DVDs, Network-attached storage (NAS), memory storage provided via a Storage Area Network (SAN), and the like. In certain instances, when an application is deployed to or installed on application system 102, information related to the application may be stored in non-volatile memory 114.

The storage-related requirements for an application may be specified in application storage profile information associated with or configured for the application. In certain embodiments, the application storage profile information for various applications deployed to or executed by application system 102 may be stored in non-volatile memory 114 as information 118.

In certain embodiments, information received by application system 102 from storage controller system 106 may also be stored in non-volatile memory 114. For example, application system 102 may receive an application ID generated by storage controller system 106 for an application and information identifying one or more storage virtual machines associated with the application ID and selected by storage controller system 106 for servicing storage requests generated by the application associated with the application ID. Information related to application IDs for multiple applications and their associated storage virtual machines information may be stored in non-volatile memory 114 as information 120.

Application system 102 depicted in FIG. 1 is merely an example and is not intended to be limiting. One of ordinary skill in the art would recognize many possible variations, alternatives, and modifications. For example, in some implementations, application system 102 may have more or fewer components than those shown in FIG. 1, may combine two or more components, or may have a different configuration or arrangement of components. While only one application system 102 is depicted in FIG. 1 for purposes of simplicity, this is not intended to be limiting. A typical distributed environment generally includes multiple application systems, each configured to execute one or more applications.

Applications executed by one or more application systems may use one or more storage resources. These storage resources may be distributed and virtualized within environment 100. For example, in a cloud environment, the storage resources may be spread across one or more data centers 104. While only one data center 104 is depicted in FIG. 1 for purposes of simplicity, a typical distributed environment includes multiple data centers distributed in environment 100 possibly at different geographical locations. Each data center may comprise multiple types of storage resources. Use of and access to these storage resources may be managed by one or more virtual machines executed by the data centers. These virtual machines may be referred to as storage virtual machines since they are responsible for providing storage-related services.

In the example depicted in FIG. 1, data center 104 may comprise storage resources 122 and one or more data center systems 124. Storage resources 122 may include memories of one or more types such as a hard or floppy disks, flash memories, SSDs, USB flash drives, memory cards and sticks, cassettes, hard drives, CDs, DVDs, Network-attached storage (NAS), memory storage provided via a Storage Area Network (SAN), and the like. Data center systems 124 may be configured to execute programs that are responsible for managing and providing storage services to applications using storage resources 122. In certain embodiments, a data center system 124 may execute one or more virtual machines (storage virtual machines) 126 that are configured to provide storage services related to storage resources 122.

In certain embodiments, storage virtual machines 126 may include one or more storage virtual machines having possibly different capabilities and providing different storage-related features. For example, a first storage virtual machine may provide a particular storage-related feature (e.g., compression-related feature) that may not be provided by a second storage virtual machine. Accordingly, each storage virtual machine in storage virtual machines 126 may be configured to provide or support a particular set of storage-related capabilities or features that may be different from or the same as the set of storage-related capabilities or features supported by another storage virtual machine. In a similar manner, the storage devices that a particular storage virtual machine is configured to support may be different from those supported by another storage virtual machine.

The configuration of data center 104 depicted in FIG. 1 is just an example and is not intended to be limiting. In certain embodiments, a storage virtual machine may also manage and provide storage-related services for storage resources that are remotely located from the storage virtual machine. For example, a storage virtual machine 126 may provide storage-related services for storage resources that are remote from (e.g., located remotely from data center 104) the storage virtual machine.

In certain embodiments, a storage virtual machine can provide storage-related services for one or more applications, where the applications are executed by the same or different application systems. An application can be provided storage-related services by one or multiple storage virtual machines.

Figure 2:
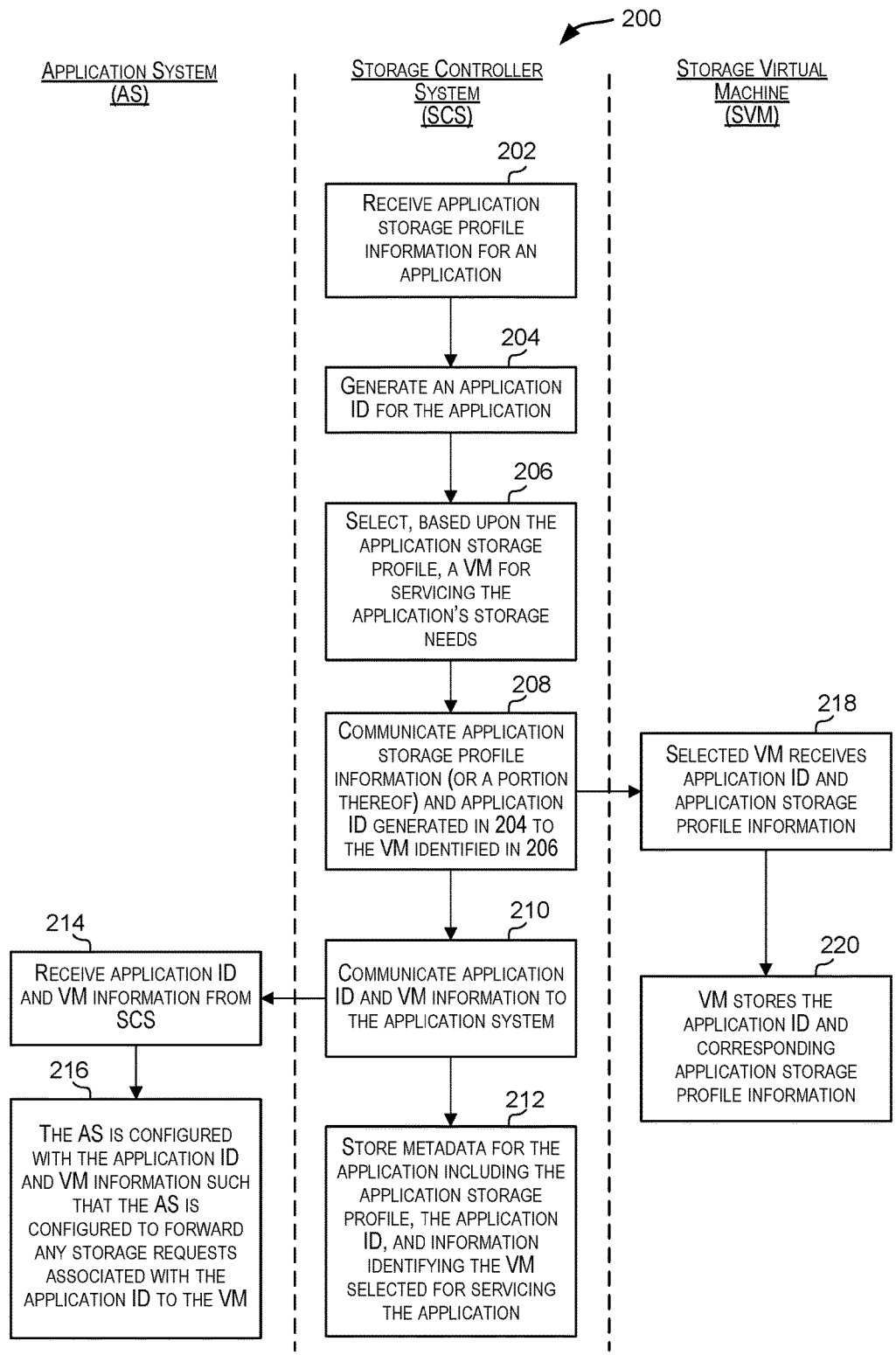
FIG. 2 depicts a simplified flowchart depicting processing performed during the setup phase according to certain embodiments.
Figure 3:
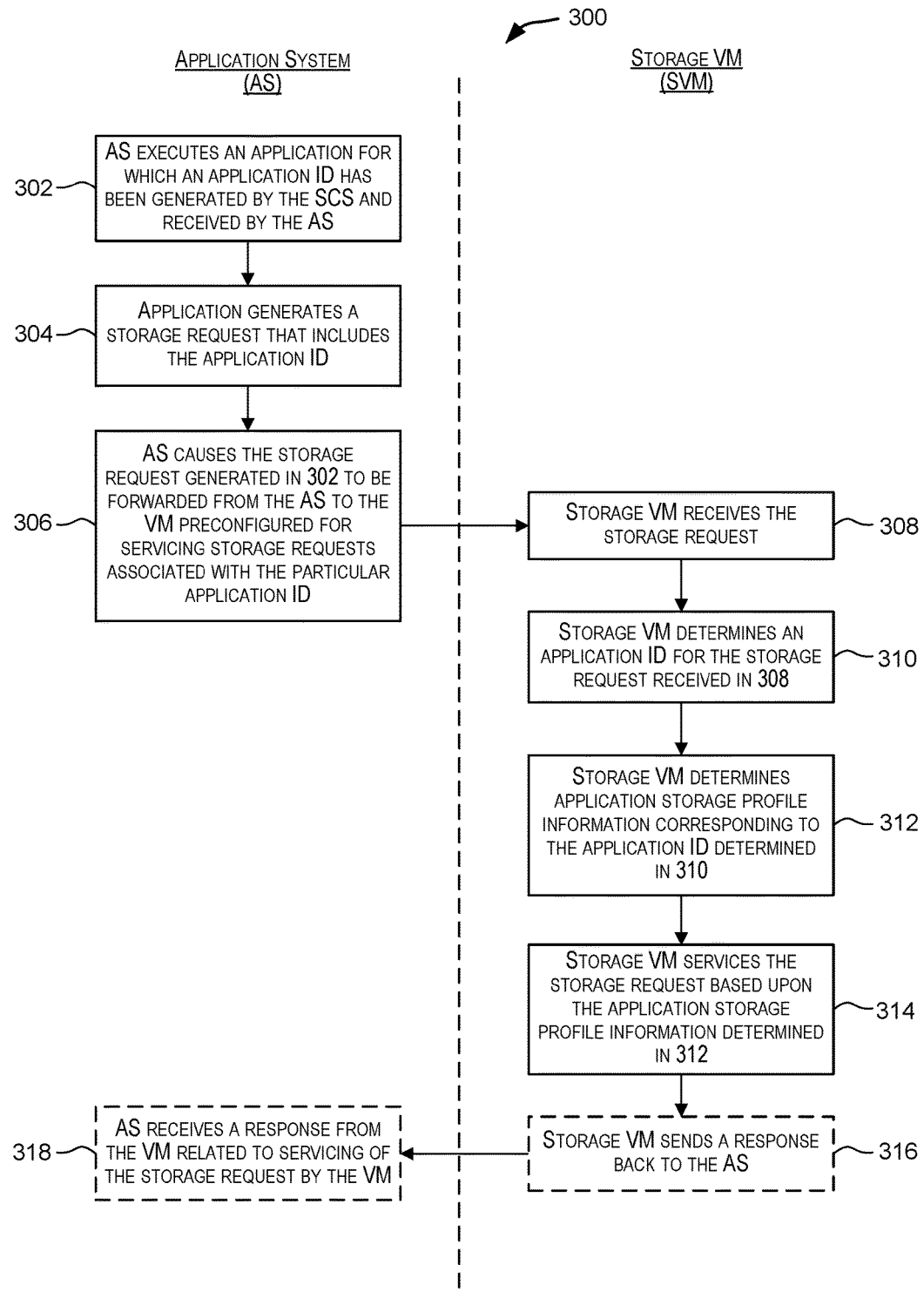
FIG. 3 depicts a simplified flowchart depicting processing performed during the runtime phase according to certain embodiments.
Figure 4:
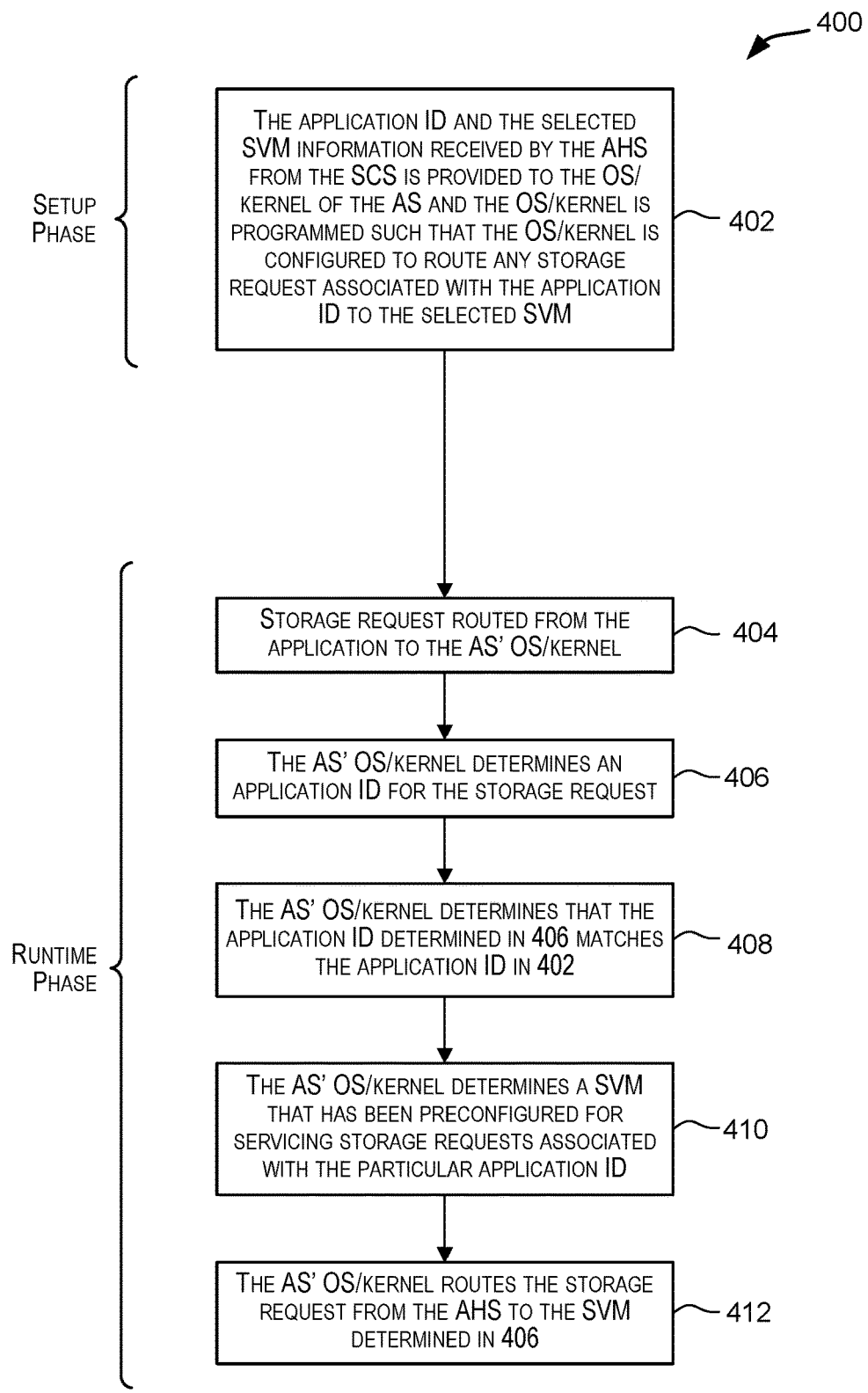
FIG. 4 depicts a simplified flowchart showing processing performed during the setup phase for configuring the application system and processing performed during the runtime phase that causes the application system to route storage requests from an application to the selected storage virtual machine according to certain embodiments.

Storage controller system 106 provides a centralized system for enabling and managing the provision of storage-related services to applications based upon requirements specified by the applications. In certain embodiments, the processing for providing these storage services involves two phases: a setup phase followed by a runtime phase. In the setup phase, processing is performed by a storage controller system for configuring the application system for an application and the virtual machines selected for providing storage services for the application such that, during runtime processing, the virtual machines can service storage requests generated by the application executing on the application system. Further details related to processing performed during the setup phase in certain embodiments are depicted in FIG. 2 and described below. In the runtime phase, an executing application may generate one or more storage requests, which are then routed to a particular storage virtual machine selected for servicing storage requests for that application, and the storage requests are then serviced by the particular storage virtual machine per the application's pre-configured storage-related requirements. Further details related to processing performed during the runtime phase in certain embodiments are depicted in FIGS. 3 and 4, and described below.

FIG. 2 depicts a simplified flowchart 200 depicting processing performed during the setup phase according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 2 and described below is intended to be illustrative and non-limiting. The particular series of processing steps depicted in FIG. 2 is not intended to be limiting. In certain embodiments, such as the embodiment depicted in FIG. 1, the processing depicted in FIG. 3 may be performed by application system 102, storage controller system 106, and a storage virtual machine selected from virtual machines 126 for servicing an application.

In certain embodiments, setup phase processing is triggered when, at 202, the storage controller system receives application storage profile information for an application. Various different events may trigger the communication of the application storage profile information for an application to the storage controller system. In some instances, the application storage profile information for an application may be communicated to the storage controller system as part of the application's deployment process. For example, a deployment system that is used for deploying or installing the application on an application system may be configured to, as part of the deployment process, communicate the application storage profile information for the application to the storage controller system. This may be done automatically by the deployment system or may be triggered by a user, such as a system administrator, in charge of the deployment process.

In some embodiments, the application system on which the application is deployed or installed may be configured to communicate the application storage profile information for the application to the storage controller system. This may be done, for example, as part of the deployment process. For example, an application system may receive the application storage profile information for an application from the deployment system as part of the application's deployment, and then communicate the received application storage profile information to the storage controller system as part of the deployment process or after the application has been successfully deployed. For example, in the embodiment depicted in FIG. 1, application system 102 may receive application storage profile information for application 115, when the application is deployed to application system 102. The application storage profile information may be stored by application system 102 as part of information 118. Application system 102 may then be configured to communicate the application storage profile information for the application to storage controller system 106.

In certain other embodiments, other events not related to deployment may cause communication of application storage profile information for an application to the storage controller system. For example, in some instances, when an application is executed by the application system, the application may be configured to communicate application storage profile information for the application, which may be stored by the application system, from the application system to the storage controller system. For example, when application 115 is executed by application system 102 in FIG. 1, application 115 may be configured to communicate its application storage profile information to storage controller system 106.

In certain embodiments, the storage controller system may provide a registration process for registering an application with the storage controller system in order for the application to make use of storage services enabled by the storage controller system. As part of this registration process, the storage controller system may request application storage profile information for an application being registered. In some instances, this registration may be performed as part of deploying the application. In other instances, registration may be performed outside and separate from the deployment process. For example, a user or provider of the application may, at any time, register the application with the storage controller system and provide application storage profile information for the application to the storage controller system as part of the registration process. In some instances, the registration process may be invoked and performed when an application executes.

The application storage profile information for an application provides a mechanism for the application's storage-related requirements to be declaratively specified. The application storage profile information for an application also provides a way for the application to share its storage-related requirement with an external entity such as the storage controller system. Different applications may have different storage-related requirements. Accordingly, the storage-related requirements for one application may be different from the storage-related requirements for another application. Thus, application storage profile information may be specified on a per application basis. In certain embodiments, the specific storage-related requirements for an application can be specified independent of other applications.

In certain embodiments, the application storage profile information for an application may include (a) information related to the application and, (b) information identifying the application's storage-related needs or requirements. Information related to the application may include information such as the name of the application, information related to the application system on which the application is to be executed, and the like. In certain embodiments, the information related to the application system may include a network address for the application system (e.g., an IP address of the application system), information identifying a geographic location of the application system, information related to the memory or processing capabilities of the application system, information related to other applications hosted by the application system, and other information. In certain embodiments, the information related to the application may include information indicative of the current processing load of the system on which the application is running.

As indicated above, the profile information for an application may also include information identifying the application's storage-related needs or requirements. In certain embodiments, these storage-related needs or requirements may be specified as (a) quality of service (QoS) information and, (b) a feature vector. In certain embodiments, the QoS information for an application identifies one or more service levels needed by the application. In certain embodiments, service levels may refer to different storage device types having different associated performance characteristics (e.g., speed of storage operations) such as cache engines, solid states drives (SSDs), hard disks, and others. Accordingly, a particular service level specified for an application may indicate a particular type of storage device that the application needs. As indicated above, the different types of storage devices can have different speeds and other performance characteristics. Accordingly, a particular service level specified for an application may also indicate the speed and/or other storage device-related performance characteristics needed by the application. In some embodiments, the service levels may be hierarchically related to one another in terms of speed or performance.

One or more service levels may be specified for an application. For example, an application may specify multiple QoS requirements. For example, in one instance, an application may specify that it wants to use three different service levels corresponding to a cache engine, a solid state drive, and a traditional hard disk drive. In such an instance, the application's data (e.g., a database for the application) may be stored in either of the above three mentioned types of devices (e.g., cache engine, solid state drive or hard disk drive).

In certain embodiments, the feature vector identifies various storage-related features that are required by the application. Examples of storage-related features may include without restrictions:

Caching-related features, for example, does the application need caching; if yes, what kind of caching such as active data caching or other caching techniques.

Replication-related features, for example, does the application need replication to provide for fault tolerance.

Compression-related features, for example, does the application need compression.

Deduplication-related features, for example, does the application need deduplication to be performed.

Features related to coalescing or combining writes, for example, indicative of whether writes are to be coalesced or combined for the application. Coalescing and combining writes means to combine successive writes to a memory (volatile or non-volatile), so as to increase the latency in cases where successive write to a memory location occur at regular intervals). For example, consider for an account, the city of the account holder and other details like pin code of the account holder may be stored in a database. Writes related to changing city and pin code may be coalesced as a database transaction. In such a scenario, the application may specify upfront that the coalescing feature is to be used for the application.

Object store-related features, for example, whether the application deals with an object store and needs optimizations for certain kinds of objects stored in the object store. For example, consider an object store storing objects named Account. Now, if the application is continuously performing, for a user, operations on object Account where branch is New York, the memory operations can be optimized by loading the set of Account objects where branch location is New York in main memory (RAM) or cache engine for a certain period of time and performing all the transactions at a faster rate and then storing back the objects to the object store. In such a scenario, the application may specify upfront that the object-store related features are to be used for the application.

Key value store-related features, for example, does the application deal with key-value pairs and, if so, does it need optimizations for operations on certain sets of keys. For example, consider a key-value store comprising a key as account identifier and value as account details. Now if the application is, for a user, continuously performing operations on account details whose corresponding account identifier values lie between 1 to 100, then the operation can be optimized by loading key-value pairs for the set of keys whose values lie between 1 to 100 in main memory or cache engine and performing all the transactions at a faster rate and then storing it back key-value store. In such a scenario, the application may upfront specify that the key value store-related features are to be used for the application.

Database-related features, for example, whether database specific read/write optimizations are to be provided such as by pulling partial database in the main memory for various storage-related operations. For example, consider a database store storing an account table where all account details are updated. Now, if the application is continuously performing operations on account details for a user, then the operation can be optimized by loading the partial base or the account table in main memory or cache engine and performing all the transactions at a faster rate and then storing it back to the database. In such a scenario, the application may upfront specify that database-related features are to be used for the application.

Other storage-related features.

The application storage profile information for an application thus enables the application's storage-related needs and requirements to be declaratively stated upfront, possibly, even before the application is executed. An application can declaratively upfront specify its storage-related requirements. The application can then share its application storage profile information with a storage controller system.

At 204, the storage controller system generates a unique application identifier (application ID) for the application whose application storage profile information is received in 202. Storage controller system may use various different techniques to generate a unique identifier for the application.

Referring back to FIG. 2, at 206, the storage controller system selects a particular storage virtual machine for servicing the application's storage requests. The storage controller system may select the particular storage virtual machine from among multiple storage virtual machines available for servicing applications. The selected storage virtual machine is one that can support, i.e., can provide or satisfy, the application's QoS and features vector specified storage-related requirements, as specified in the application storage profile information for the application.

The storage controller system may perform the selection in 206 by comparing the application's storage-related requirements with capabilities and features of available storage virtual machines. In certain embodiments, the storage controller system may store or have access to information related to the multiple storage virtual machines that are available for servicing applications and their capabilities. These storage virtual machines may be distributed within a network possibly across multiple data centers, and the like. The storage controller system may have access to information about these multiple storage virtual machines, where the information for a storage virtual machine indicates the status of the storage virtual machine (e.g., whether it is available for use, information indicating its work load) and information indicative of the storage virtual machine's capabilities and storage-related features supported by the storage virtual machine. In certain embodiments, such as the embodiment depicted in FIG. 1, storage controller system 106 may store information related to the multiple storage virtual machines as part of information 130. The storage controller system may then select a particular storage virtual machine in 206 based upon the application storage profile information received in 202 and based upon information related to storage virtual machines available to the storage controller system.

There are various ways by which a storage controller system gets access to information related to the storage virtual machines. For example, in certain embodiments, when a storage virtual machine is activated and available for use, the storage virtual machine may be configured to communicate information to the storage controller system about the storage virtual machine's status and capabilities (e.g., a list of features supported by the storage virtual machine). A storage virtual machine may be also configured to periodically send updated information related to the storage virtual machine to the storage controller system. In other embodiments, a storage controller system may query various data centers and other storage resource systems and get information from them about storage virtual machines provided by the storage systems and their capabilities. In certain embodiments, static information about the storage virtual machines and their static configurations may be communicated to the storage controller system at boot time or can be provided to the storage controller system as a separate configuration when it is booted up.

The storage controller system may use various different criteria and techniques for selecting a particular virtual machine for servicing the application's storage requests. In certain embodiments, the storage controller system is configured to determine the application's needs, as specified in the QoS and feature vector information included in the application storage profile information received in 202, and determine a particular storage virtual machine that is capable of satisfying all the application's needs. For example, the storage controller system may determine the QoS criteria specified for the application from the QoS information and determine the set of storage-related features specified for the application by the feature vector included in the application storage profile information. The storage controller system may then determine a storage virtual machine that is capable of supporting, i.e., providing, the application's QoS criteria and is also capable of providing the set of storage-related features.

In certain embodiments, the storage controller system may also use the application related information included in the application storage profile information to select a particular storage virtual machine for servicing the application's storage requests. For example, as indicated above, the application-related information may include information related to the application system on which the application is to execute such as information identifying the application system's geographical location. Alternatively, the storage controller system may determine the geographical location of the application system from the application system's network address included in the application storage profile information. The storage controller system may then select a storage virtual machine that is geographically proximal to the application system and can also support the application's QoS and feature vector requirements. Using geographical proximity as a criterion for selecting the storage virtual machine enables a storage virtual machine to be selected that can provide optimal performance for that application since, generally, the more proximal the storage-related services are to the application the better the performance for storage-related services.

The use of geographical proximity in selecting a particular storage virtual machine may particularly be used in situations where there are multiple storage virtual machines that are capable of satisfying the application's QoS and feature vector requirements. In such a scenario, the storage controller system may then select a particular storage virtual machine from these multiple storage virtual machines that is closest geographically to the application system that is configured to execute the application. As part of this processing, the storage controller system may determine geographical locations for each of the multiple storage virtual machines. The storage controller system may then select a particular virtual machine from the multiple storage virtual machines for servicing the application that is located geographically closest to the geographical location of the application system.

A single storage virtual machine can service multiple applications. Accordingly, in certain embodiments, storage controller system may also perform some load balancing processing in selecting a particular storage virtual machine from among multiple storage virtual machines that are capable of satisfying the application's QoS and feature vector requirements. For example, in a scenario where multiple storage virtual machines are capable of satisfying the application's QoS and feature vector requirements, the storage controller system may balance the load across the storage virtual machines to avoid overloading any one storage virtual machine. In one embodiment, the number of applications serviced by a storage virtual machine may be used as criteria for performing the load balancing and selecting a storage virtual machine. For better performance, in some embodiments, a storage virtual machine servicing a lower number of applications may be preferred to a storage virtual machine servicing a higher number of applications. Various different load balancing schemes, such as round-robin, least recently used (LRU), and others, may be used by storage controller system to select a particular storage virtual machine for serving the application.

In some embodiments, the load on the systems executing the eligible storage virtual machines may be taken into account for selecting a particular storage virtual machine. Accordingly, in situations where multiple storage virtual machines are available that can service an application's storage-related needs, a particular storage virtual machine may be selected for servicing the application where that particular storage virtual machine executes on a system that has less load than systems executing the other eligible storage virtual machines.

As discussed above, various different criteria may be used for selecting a particular storage virtual machine in 206. In certain embodiments, various combinations of techniques (e.g., various load balancing technique using different criteria) may be used for selecting the storage virtual machine in 206.

Referring back to FIG. 2, at 208, the storage controller system communicates the application ID generated in 204 and the application storage profile information received in 202 (or a portion of the application storage profile information) to the particular storage virtual machine selected in 206.

In some embodiments, as part of 208, the storage controller system may determine a particular system executing the storage virtual machine selected in 206 and communicate the application ID and the application storage profile information (or a portion thereof) to that particular system, where the information is then forwarded to the selected storage virtual machine on the system. For example, information may be available to the storage controller system identifying various storage virtual machines and systems executing the storage virtual machines. The storage controller system may use this information in 208 to determine a particular system executing the storage virtual machine selected in 206.

At 218, the particular storage virtual machine selected in 206 receives the application ID and the application storage profile information from the storage controller system. In certain embodiments, the information sent by the storage controller system may be received by a system executing the selected storage virtual machine. One or more compute nodes or processes may be provided that are configured to receive the application ID and the application storage profile information from the storage controller system and forward the information to the appropriate selected storage virtual machine.

In some embodiments, the storage virtual machines, including the selected storage virtual machine, may be part of a cloud infrastructure (e.g., the storage virtual machines may be provided as services provided by the cloud infrastructure). In such an environment, one or more compute nodes may be provided that are configured to receive the application ID and the application storage profile information from the storage controller system. A compute node receiving the information may then determine a particular system executing the selected storage virtual machine and then forward the information received from the storage controller system to that particular system, where it is then forwarded to the selected storage virtual machine.

At 220, the storage virtual machine may store the information received from the storage controller system. For example, in the embodiment depicted in FIG. 1, information mapping an application ID to its corresponding application storage profile information may be stored as part of information 128 by the storage virtual machine. Information 128 may comprise information related to one more application IDs. The storage virtual machine may then use the stored information during the runtime processing phase, as described below. The application ID provides the link for the storage virtual machine to determine the corresponding application storage profile information, which enables the storage virtual machine to determine the storage requirements of that application.

At 210, the storage controller system communicates the application ID generated in 204 and information identifying the storage virtual machine selected in 206 to the application system that will execute the application (and be the source of storage requests from the executing application) for which the application storage profile information was received in 202. In certain embodiments, the storage virtual machine may be identified using their network address (e.g., IP addresses). Accordingly, in 210, the IP address of the selected storage virtual machine may be communicated from the storage controller system to the application system. In some embodiments, storage virtual machines may be identified based upon unique identifiers assigned to and associated with the storage virtual machines. In such embodiments, in 210, the unique identifier of the selected storage virtual machine may be communicated from the storage controller system to the application system.

At 214, the application system receives the application ID and the selected storage virtual machine information. At 216, the application system is configured with the received application ID and storage virtual machine information such that the application system is configured to forward any storage requests associated with the particular application ID (e.g., storage requests generated by the application corresponding to the application ID) to the particular selected storage virtual machine. As part of 216, the application ID and storage virtual machine information may be stored by the application system. For example, in the embodiment depicted in FIG. 1, application system 102 may store the application ID and corresponding storage virtual machine information as part of information 120.

At 212, the storage controller system may store information mapping the application storage profile information received in 202 to the application ID generated in 204 and to the storage virtual machine determined in 206. For example, as depicted in FIG. 1, a table 132 may be stored comprising the metadata where each row of the table identifies an application ID 134, information 136 identifying an application for which the application ID was generated, the corresponding application storage profile information 138 received for the application, and information 140 identifying a storage virtual machine selected for servicing storage requests associated with the application ID.

Although FIG. 2 depicts the various processing steps occurring in a particular sequence or order, this is not intended to be limiting. In certain alternative embodiments, the steps may be performed in some different order or some steps may also be performed in parallel. For example, while steps 208, 210, and 212 are shown as occurring in a particular order in flowchart 200 in FIG. 2, this is not intended to be limiting. In alternative embodiments, these can occur in any order. In yet other embodiments, the processing in 208, 210, and 212 may overlap or may be performed in parallel.

In the example depicted in FIG. 2 and described above, a single storage virtual machine is selected for servicing the application. However, this is just an example and not intended to be limiting. In certain embodiments, multiple storage virtual machines may be selected by a storage controller system for servicing an application. Information identifying the multiple selected storage virtual machines may then be communicated from the storage controller system to the application system along with the application ID information. Each of the multiple selected storage virtual machines also receives the application ID and the application storage profile information for the application.

A particular storage virtual machine may be selected to service multiple applications. As described above, in certain embodiments, the storage controller system may perform load balancing analysis to ensure that the load of servicing applications is spread across multiple storage virtual machines. The number of applications that a particular storage virtual machine is servicing may be taken into account as part of the load balancing processing. Load balancing processing may also take into account the type of applications serviced by the storage virtual machines.

Once the setup phase processing, as described above, has been completed, during runtime processing, storage requests from the application corresponding to the application ID can then be serviced by the storage virtual machine selected for that application ID. FIG. 3 depicts a simplified flowchart 300 depicting processing performed during the runtime phase according to certain embodiments. The processing depicted in FIG. 3 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 3 and described below is intended to be illustrative and non-limiting. The particular series of processing steps depicted in FIG. 3 is not intended to be limiting. In certain embodiments, including the example depicted in FIG. 3, the runtime processing involves the application system and a storage virtual machine. For example, the runtime processing may be performed by application system 102 and a storage virtual machine 126 depicted in FIG. 1.

At 302, an application system may execute an application for which an application ID has been generated by the storage controller system during the setup phase and received by the application system.

At 304, the application may generate a storage request. In certain embodiments, for an application for which an application ID has been generated by a storage controller system, the application is configured to include that application ID in all storage requests generated by the application. Thus, the storage request generated in 304 includes the application ID that has been previously generated by the storage controller system for that application.

At 306, the application system, based upon the application ID included in the storage request, causes the storage request generated by the application in 304 to be forwarded or routed from the application system to the storage virtual machine that is associated with the application ID included in the storage request.

At 308, the storage virtual machine associated with the application ID receives the storage request from the application system. In certain embodiments, the storage request may be received by a system executing the storage virtual machine configured for servicing the storage request. One or more compute nodes may be provided for servicing storage requests. A compute node receiving the storage request may determine a storage virtual machine for servicing the request based upon the application ID in the storage request and then forward the storage request to the determined storage virtual machine.

In some embodiments, the storage virtual machines configured to service storage requests may be provided as part of a cloud infrastructure. For example, the storage virtual machines may be provided as services provided by the cloud infrastructure. In such an environment, one or more compute nodes may be provided that are configured to receive the storage requests. A compute node receiving a storage request may be configured to, based upon the application ID in the storage request, determine a storage virtual machine for servicing the received storage request, and to forward the storage request to a system executing the determined storage virtual machine, where the request is then forwarded to the selected storage virtual machine.

At 310, the receiving storage virtual machine determines an application ID for the received storage request. As indicated above, in certain embodiments, the application ID is included in the storage request. Accordingly, the storage virtual machine may determine the application ID for the storage request from the storage request itself.

At 312, the storage virtual machine determines the application storage profile information corresponding to the application ID determined in 310. As previously described with respect to FIG. 2, during the setup phase, the storage virtual machine selected for servicing a particular application receives and stores the application ID generated for the application by the storage controller system and the associated application storage profile information for the application for which the application ID is generated by the storage controller system. As part of 312, the storage virtual machine may use this stored mapping information to determine the application storage profile information for the application ID determined in 310 for the storage request received by the storage virtual machine in 308. The application storage profile information determined in 312 enables the storage virtual machine to know the application's storage-related requirements and thus how to service the storage request received in 308.

At 314, the storage virtual machine services the storage request based upon the application storage profile information determined in 312. Servicing the storage request may involve performing one or more functions or operations corresponding to the storage request. Further, the storage request is serviced in accordance with the QoS criteria and feature vector specified features specified by the application storage profile information determined in 312. Accordingly, the QoS criteria and feature vector specified features specified for the application are met or satisfied when the storage request is serviced. The storage request is thus serviced while satisfying the QoS criteria and features specified by the application storage profile information. For example, if the feature vector indicates that the application requires a certain type of caching and deduplication, then that type of caching and deduplication is performed when the storage request is serviced. In certain embodiments, the storage virtual machine goes over the application's storage-related requirements specified by the QoS information and the feature vector to check whether any required performance optimization or additional processing is to be performed for the storage request (e.g., with respect to replication, compression, etc.) and that additional processing or optimization is performed. This provides a boost to the IOPS (Input/Output Operations Per Second) for the application.

The storage virtual machine may use different protocols to service the storage request in 314. For example, the storage virtual machine may support various protocols such as Network File System (NFS) protocol, iSCSI (Internet Small Computer System Interface), Common Internet File System (CIFS) protocol, Server Message Block, Oracle® Corporation proprietary protocols such as ZFS file system protocol, and others.

In certain embodiments, at 316, the storage virtual machine may optionally generate a response to the storage request and send the response back to the application system from which the storage request was received in 308. The response may include information indicating the status (e.g., success or failure) of servicing the storage request. At 318, the application system may optionally receive the response from the storage virtual machine.

For example, consider a case where the storage request generated by the application requests an update to an account balance for an account, where the account information, including the account balance information, is stored in an account table in a database. The account table may have a column storing account balance information. In certain embodiments, when the application generates such a storage request, the application system where the application is running may first do a lookup and check whether the request is going to a valid storage virtual machine that has been assigned to the application. Once the validation has passed successfully, the application system may then send the storage request to a particular storage virtual machine determined based upon the application ID associated with the storage request. The storage virtual machine receiving the storage request may then determine the application storage profile information for the storage request based upon the application ID associated with the received storage request, and then process the storage request according to the QoS and features information specified in the determined application storage profile information. For example, the QoS information may identify a particular service level that may indicate that the storage device type to be used is a hard disk drive, and the feature vector may indicate that services like caching, key-value store optimizations, object store or database optimizations, deduplication, replication, and compression are to be provided. The storage virtual machine may then process the storage request based on the determined QoS and features parameters. For example, a read or write operation may be performed with respect to the account table in the database in accordance with the determined QoS and features parameters. The storage virtual machine may then generate and provide a response back to the system on which the application is running and which was the source of the storage request.

As described above, during the setup phase, the application system is configured with the application ID information and the selected storage virtual machine information received from the storage controller system (for example, in 216 depicted in FIG. 2 and described above). During runtime, the application system executes the application and storage requests generated by the application corresponding to the application ID are routed to the selected storage virtual machine (for example, in 306 in FIG. 3). Various different techniques may be used to configure the application system during the setup phase such that, at runtime, the application system routes a storage request received from an application corresponding to the application ID to the selected storage virtual machine. FIG. 4 depicts a simplified flowchart 400 showing processing performed during the setup phase for configuring the application system and processing performed during the runtime phase that causes the application system to route storage requests from an application to the selected storage virtual machine according to certain embodiments. The processing depicted in FIG. 4 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4 and described below is intended to be illustrative and non-limiting. The particular series of processing steps depicted in FIG. 4 is not intended to be limiting. The processing depicted in FIG. 4 may be performed by a storage controller system such as storage controller system 106 depicted in FIG. 1.

During the setup phase, at 402, the application ID and the information identifying the storage virtual machine information selected by the storage controller system for the application ID that are received by the application system from the storage controller system are provided to the operating system/kernel of the application system and the operating system/kernel is programmed such that the operating system/kernel is configured to route any storage requests associated with the application ID to the selected storage virtual machine.

In certain embodiments, the processing in 402 may be performed during the application system's boot-up sequence. As part of the boot-up process, the application ID and information identifying a storage virtual machine information that will service storage requests associated with the application ID is provided to the operating system/kernel of the system on which the application will run or be executed.

During the runtime phase, at 404, a storage request generated by the application executing on the application system is routed to the application system's operating system/kernel. At 406, the operating system/kernel determines an application ID associated with the storage request. As previously indicated, for an application registered with a storage controller system, the application ID generated by the storage controller system for that application is included in any storage request generated by that application. Accordingly, the storage request received by the operating system/kernel includes the application ID. The operating system/kernel can thus determine the application ID associated with the storage request from the storage request itself.

At 408, the operating system/kernel determines that the application ID determined in 406 matches the application ID configured in 402 and, as a result, the storage request is to be specially handled. As part of this special handling, in 410, the application system's operating system/kernel determines a storage virtual machine that has been preconfigured in 402 for providing storage-related services for that application ID. At 412, the application system's operating system/kernel routes the storage request to the storage virtual machine determined in 410. As part of 412, the operating system/kernel ensures that the application ID is included in the storage request routed to the storage virtual machine.

In certain embodiments, the processing in 402 may be performed as part of step 216 depicted in FIG. 2 and the processing depicted in 404, 406, 408, 410, and 412 may be performed as part of step 306 depicted in FIG. 3.

In certain embodiments, the storage controller system may execute a virtual machine (storage controller virtual machine) that is programmed to perform processing pertaining to the setup and runtime phases as described above. For example, in the embodiment depicted in FIG. 1, storage controller system 106 may execute a storage controller virtual machine 142, which may be configured to perform the setup phase and runtime phase related processing that is performed by storage controller system 106, as described above.

As described above, the storage controller system (e.g., storage controller system 106 in FIG. 1) provides a centralized system for enabling and managing the provision of storage-related services to applications based upon the applications' storage-related requirements. The applications themselves and the storage virtual machines providing the storage-related services may be distributed within a network environment. The ability of the storage controller system to centrally manage the enabling of these storage-related services helps lower the cost of operations.

As described above, the storage controller system receives application storage profile information for multiple applications. The centralized storage controller system thus maintains a centralized view of storage-related requirements for multiple applications. The storage controller system also stores and/or has access to information related to various storage virtual machines that are available for providing storage-related services including information indicative of the features that are supported by the various storage virtual machines. This enables the storage controller system to have a centralized view of the various storage virtual machines available for servicing the applications and their respective capabilities. Additionally, the storage controller system also stores information identifying which storage virtual machines are servicing which applications. This enables the storage controller system to have a centralized view of how different applications are being serviced by different storage virtual machines. This centralized view simplifies management of the overall infrastructure leading to lower the cost of operations.

As described above, a particular storage virtual machine is selected for servicing storage requests from a particular application based upon the application's storage-related requirements and the storage virtual machine's capabilities. In this manner, the application's storage-related requirements are taken into consideration when selecting the storage virtual machine for servicing the application. Since a storage virtual machine is selected specifically for the application, the provision of storage-related services by that selected storage virtual machine is thus customized for that particular application. The application thus drives the way in which storage-related services are provided to the application. This significantly improves the efficiency and performance of storage-related services provided for that application. This in turn improves the application's performance since storage-related services are provided to the application based upon that particular application's specified requirements. Further, as previously described, an application can specifically indicate features that are to be provided such as, for examples, features related to replication, which in turn increase the fault tolerance of the application. The storage controller system also provides a centralized view of the storage environment, for example, for storage in a cloud environment.

Additionally, as described above, criteria such as proximity of storage virtual machines to the executing application, the load of individual storage virtual machines, the load or capacity of systems executing the storage virtual machines, and other load balancing criteria may be taken into consideration when selecting a storage virtual machine for servicing a particular application. This results in the selection of a storage virtual machine that is not only capable of supporting the application's storage-related requirements but also provides optimal performance in the provision of the storage-related services for the application. As a result, the TOPS (Input/Output Operations Per Second) associated with the provision of the storage-related services to the application is also improved or boosted and also leads to increased fault tolerance.

The infrastructure can be implemented in various different environments including a cloud environment (could be various types of clouds including private, public, and hybrid cloud environments), on-premises environment, a hybrid environment, and the like. The infrastructure enables virtualizing of storage for applications based on requirements specified by the applications. The applications may be running on various nodes within a cloud and the storage virtual machines may also be spread across the cloud.

Figure 5:
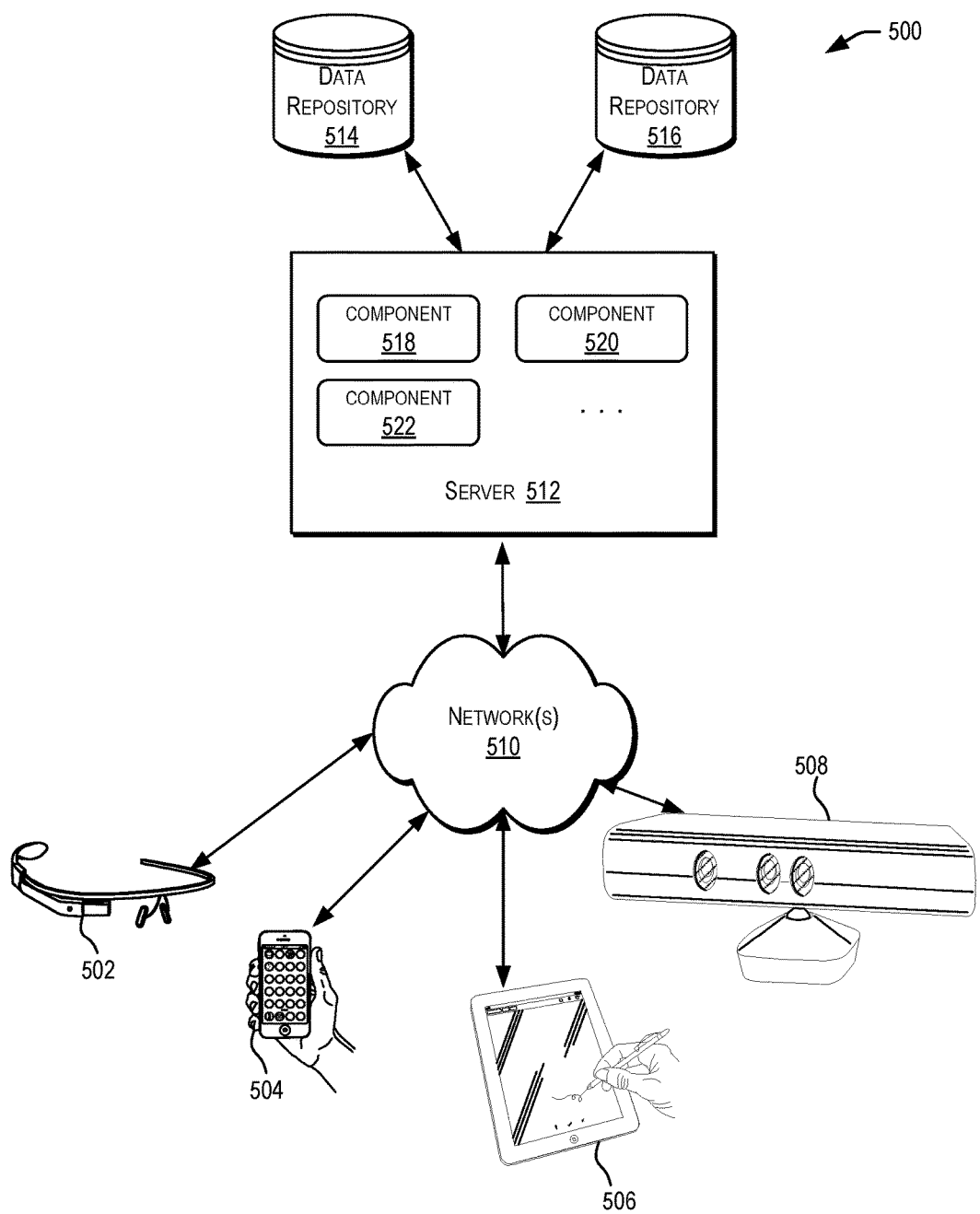
FIG. 5 depicts a simplified diagram of a distributed system for implementing an embodiment.

FIG. 5 depicts a simplified diagram of a distributed system 500 for implementing an embodiment. In the illustrated embodiment, distributed system 500 includes one or more client computing devices 502, 504, 506, and 508, coupled to a server 512 via one or more communication networks 510. Clients computing devices 502, 504, 506, and 508 may be configured to execute one or more applications.

In various embodiments, server 512 may be adapted to run one or more services or software applications that enable an application executed by a client computing device to specify the application's storage-related requirements and server 512 enables the selection of a storage virtual machine for servicing the application's storage-related services based upon the application's specified storage-related requirements, as described in this disclosure. For example, in certain embodiments, server 512 may receive application storage profile information for an application, where the application storage profile information includes information about the application and also identifies that application's storage-related requirements. Server 512 may then generate a unique application identifier (application ID) for the application and select, based upon the application storage profile information, one or more storage virtual machines for servicing that application's storage needs. The selected one or more storage virtual machines are ones that can support, i.e., can provide or satisfy, the application's storage requirements specified in the application storage profile information for the application. Information identifying the application ID and the selected one or more storage virtual machines is communicated from server 512 to a system (application system) that will execute the application. For example, if a client computing device is configured to execute the application, the application ID and selected storage virtual machine information may be sent by server 512 to that client computing device. Information identifying the application ID and the application storage profile information is communicated from server 512 to the selected storage virtual machines. During runtime processing, a storage request generated by the application and associated with the application ID is routed from the device executing the application to a storage virtual machine that is configured to service that application's storage requests. The storage virtual machine receiving the storage request is able to determine the corresponding storage-related requirements associated with the application ID and service the storage request in accordance with those storage-related requirements. In this manner, storage services are provided to that application in accordance with that application's specified storage requirements.

In certain embodiments, server 512 may also provide other services or software applications that can include non-virtual and virtual environments. In some embodiments, these services may be offered as web-based or cloud services, such as under a Software as a Service (SaaS) model to the users of client computing devices 502, 504, 506, and/or 508. Users operating client computing devices 502, 504, 506, and/or 508 may in turn utilize one or more client applications to interact with server 512 to utilize the services provided by these components.

In the configuration depicted in FIG. 5, server 512 may include one or more components 518, 520 and 522 that implement the functions performed by server 512. These components may include software components that may be executed by one or more processors, hardware components, or combinations thereof. It should be appreciated that various different system configurations are possible, which may be different from distributed system 500. The embodiment shown in FIG. 5 is thus one example of a distributed system for implementing an embodiment system and is not intended to be limiting.

Users may use client computing devices 502, 504, 506, and/or 508 to execute one or more applications, which may generate one or more storage requests that may then be serviced in accordance with the teachings of this disclosure. A client device may provide an interface that enables a user of the client device to interact with the client device. The client device may also output information to the user via this interface. Although FIG. 5 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 510 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 510 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 512 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 512 can include one or more virtual machines running virtual operating systems, or other computing architectures involving virtualization such as one or more flexible pools of logical storage devices that can be virtualized to maintain virtual storage devices for the server. In various embodiments, server 512 may be adapted to run one or more services or software applications that provide the functionality described in the foregoing disclosure.

The computing systems in server 512 may run one or more operating systems including any of those discussed above, as well as any commercially available server operating system. Server 512 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 512 may include one or more applications to analyze and consolidate data feeds and/or event updates received from users of client computing devices 502, 504, 506, and 508. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 512 may also include one or more applications to display the data feeds and/or real-time events via one or more display devices of client computing devices 502, 504, 506, and 508.

Distributed system 500 may also include one or more data repositories 514, 516. These data repositories may be used to store data and other information in certain embodiments. For example, one or more of the data repositories 514, 516 may be used to store information such as information related to storage virtual machines, information mapping application IDs to application to selected storage virtual machines, and other information used by server 512 when performing storage controller system functions. Data repositories 514, 516 may reside in a variety of locations. For example, a data repository used by server 512 may be local to server 512 or may be remote from server 512 and in communication with server 512 via a network-based or dedicated connection. Data repositories 514, 516 may be of different types. In certain embodiments, a data repository used by server 512 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 514, 516 may also be used by applications to store application data. The data repositories used by applications may be of different types such as, for example, a key-value store repository, an object store repository, or a general storage repository supported by a file system.

Figure 6:
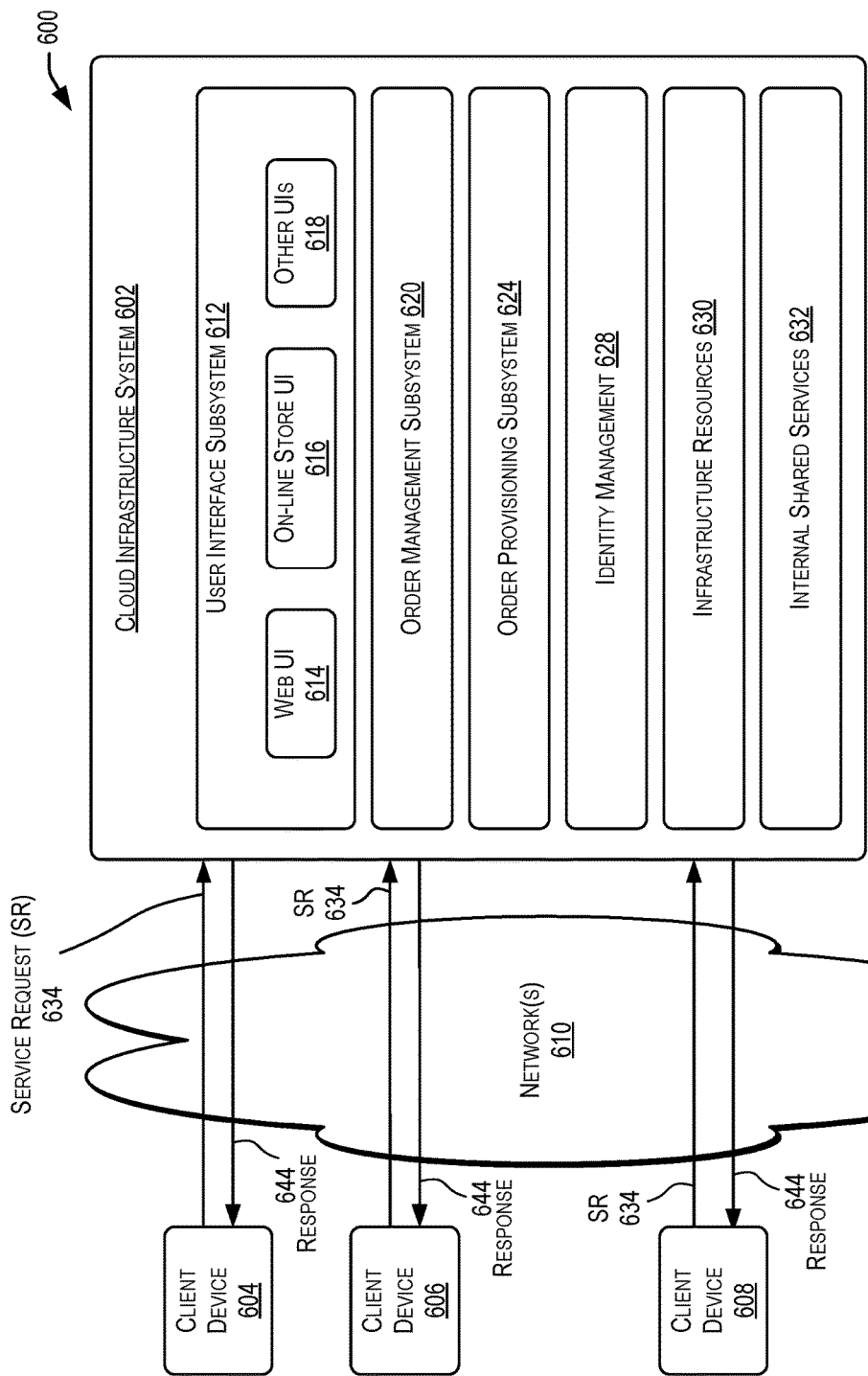
FIG. 6 is a simplified block diagram of a cloud-based system environment in which various storage-related services may be offered as cloud services, in accordance with certain embodiments.

In certain embodiments, the storage-related functionalities described in this disclosure may be offered as services via a cloud environment. FIG. 6 is a simplified block diagram of a cloud-based system environment in which various storage-related services may be offered as cloud services, in accordance with certain embodiments. In the embodiment depicted in FIG. 6, cloud infrastructure system 602 may provide one or more cloud services that may be requested by users using one or more client computing devices 604, 606, and 608. Cloud infrastructure system 602 may comprise one or more computers and/or servers that may include those described above for server 512. The computers in cloud infrastructure system 602 may be organized as general purpose computers, specialized server computers, server farms, server clusters, or any other appropriate arrangement and/or combination.

Network(s) 610 may facilitate communication and exchange of data between clients 604, 606, and 608 and cloud infrastructure system 602. Network(s) 610 may include one or more networks. The networks may be of the same or different types. Network(s) 610 may support one or more communication protocols, including wired and/or wireless protocols, for facilitating the communications.

The embodiment depicted in FIG. 6 is only one example of a cloud infrastructure system and is not intended to be limiting. It should be appreciated that, in some other embodiments, cloud infrastructure system 602 may have more or fewer components than those depicted in FIG. 6, may combine two or more components, or may have a different configuration or arrangement of components. For example, although FIG. 6 depicts three client computing devices, any number of client computing devices may be supported in alternative embodiments.

The term cloud service is generally used to refer to a service that is made available to users on demand and via a communication network such as the Internet by systems (e.g., cloud infrastructure system 602) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In certain embodiments, cloud infrastructure system 602 may provide one or more cloud services using different models such as under a Software as a Service (SaaS) model, a Platform as a Service (PaaS) model, an Infrastructure as a Service (IaaS) model, and others, including hybrid service models. Cloud infrastructure system 602 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 602. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 602. Cloud infrastructure system 602 then performs processing to provide the services requested in the customer's subscription order. For example, a user may request the cloud infrastructure system to register an application, as described above, and provide storage-related services to the application per the application's specified storage-related requirements. Cloud infrastructure system 602 may be configured to provide one or even multiple cloud services.

Cloud infrastructure system 602 may provide the cloud services via different deployment models. In a public cloud model, cloud infrastructure system 602 may be owned by a third party cloud services provider and the cloud services are offered to any general public customer, where the customer can be an individual or an enterprise. In certain other embodiments, under a private cloud model, cloud infrastructure system 602 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 602 and the services provided may be shared by several organizations in a related community. Various other models such as hybrids of the above mentioned models may also be used.

Client computing devices 604, 606, and 608 may be of different types (such as devices 502, 504, 506, and 508 depicted in FIG. 5) and may be capable of operating one or more client applications. A user may use a client device to interact with cloud infrastructure system 602, such as to request a service provided by cloud infrastructure system 602. For example, a user may use a client device to request a storage-related service described in this disclosure.

In some embodiments, the processing performed by cloud infrastructure system 602 for providing storage-related services may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. For example, big data analysis may be performed by cloud infrastructure system 602 for determining which storage virtual machine is to be selected for a particular application based upon the application's stated storage-related requirements. The data used for this analysis may include structured data (e.g., data stored in a database or structured according to a structured model) and/or unstructured data (e.g., data blobs (binary large objects)).

As depicted in the embodiment in FIG. 6, cloud infrastructure system 602 may include infrastructure resources 630 that are utilized for facilitating the provision of various cloud services offered by cloud infrastructure system 602. Infrastructure resources 630 may include, for example, processing resources, storage or memory resources, networking resources, and the like. In certain embodiments, the storage virtual machines that are available for servicing storage requested from applications may be part of cloud infrastructure system 602. In other embodiments, the storage virtual machines may be part of different systems.

In certain embodiments, to facilitate efficient provisioning of these resources for supporting the various cloud services provided by cloud infrastructure system 602 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 602 may itself internally use services 632 that are shared by different components of cloud infrastructure system 602 and which facilitate the provisioning of services by cloud infrastructure system 602. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 602 may comprise multiple subsystems. These subsystems may be implemented in software, or hardware, or combinations thereof. As depicted in FIG. 6, the subsystems may include a user interface subsystem 612 that enables users or customers of cloud infrastructure system 602 to interact with cloud infrastructure system 602. User interface subsystem 612 may include various different interfaces such as a web interface 614, an online store interface 616 where cloud services provided by cloud infrastructure system 602 are advertised and are purchasable by a consumer, and other interfaces 618. For example, a customer may, using a client device, request (service request 634) one or more services provided by cloud infrastructure system 602 using one or more of interfaces 614, 616, and 618. For example, a customer may access the online store, browse cloud services offered by cloud infrastructure system 602, and place a subscription order for one or more services offered by cloud infrastructure system 602 that the customer wishes to subscribe to. The service request may include information identifying the customer and one or more services that the customer desires to subscribe to. For example, a customer may place a subscription order for a storage-related service offered by cloud infrastructure system 602. As part of the order, the customer may provide information identifying an application for which the service is to be provided and the application storage profile information for the application.

In certain embodiments, such as the embodiment depicted in FIG. 6, cloud infrastructure system 602 may comprise an order management subsystem (OMS) 620 that is configured to process the new order. As part of this processing, OMS 620 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 620 may then invoke the order provisioning subsystem (OPS) 624 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 624 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain embodiments, setup phase processing, as described above, may be performed by cloud infrastructure system 602 as part of the provisioning process. Cloud infrastructure system 602 may generate an application ID and select a storage virtual machine for an application from among storage virtual machines provided by cloud infrastructure system 602 itself or from storage virtual machines provided by other systems other than cloud infrastructure system 602.

Cloud infrastructure system 602 may send a response or notification 644 to the requesting customer to indicate when the requested service is now ready for use. In some instances, information (e.g., a link) may be sent to the customer that enables the customer to start using and availing the benefits of the requested services. In certain embodiments, for a customer requesting the storage-related service, the response may include an application ID generated by cloud infrastructure system 602 and information identifying a storage virtual machine selected by cloud infrastructure system 602 for an application corresponding to the application ID.

Cloud infrastructure system 602 may provide services to multiple customers. For each customer, cloud infrastructure system 602 is responsible for managing information related to one or more subscription orders received from the customer, maintaining customer data related to the orders, and providing the requested services to the customer. Cloud infrastructure system 602 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 602 may provide services to multiple customers in parallel. Cloud infrastructure system 602 may store information for these customers, including possibly proprietary information. In certain embodiments, cloud infrastructure system 602 comprises an identity management subsystem (IMS) 628 that is configured to manage customers information and provide the separation of the managed information such that information related to one customer is not accessible by another customer. IMS 628 may be configured to provide various security-related services such as identity services, such as information access management, authentication and authorization services, services for managing customer identities and roles and related capabilities, and the like.

Figure 7:
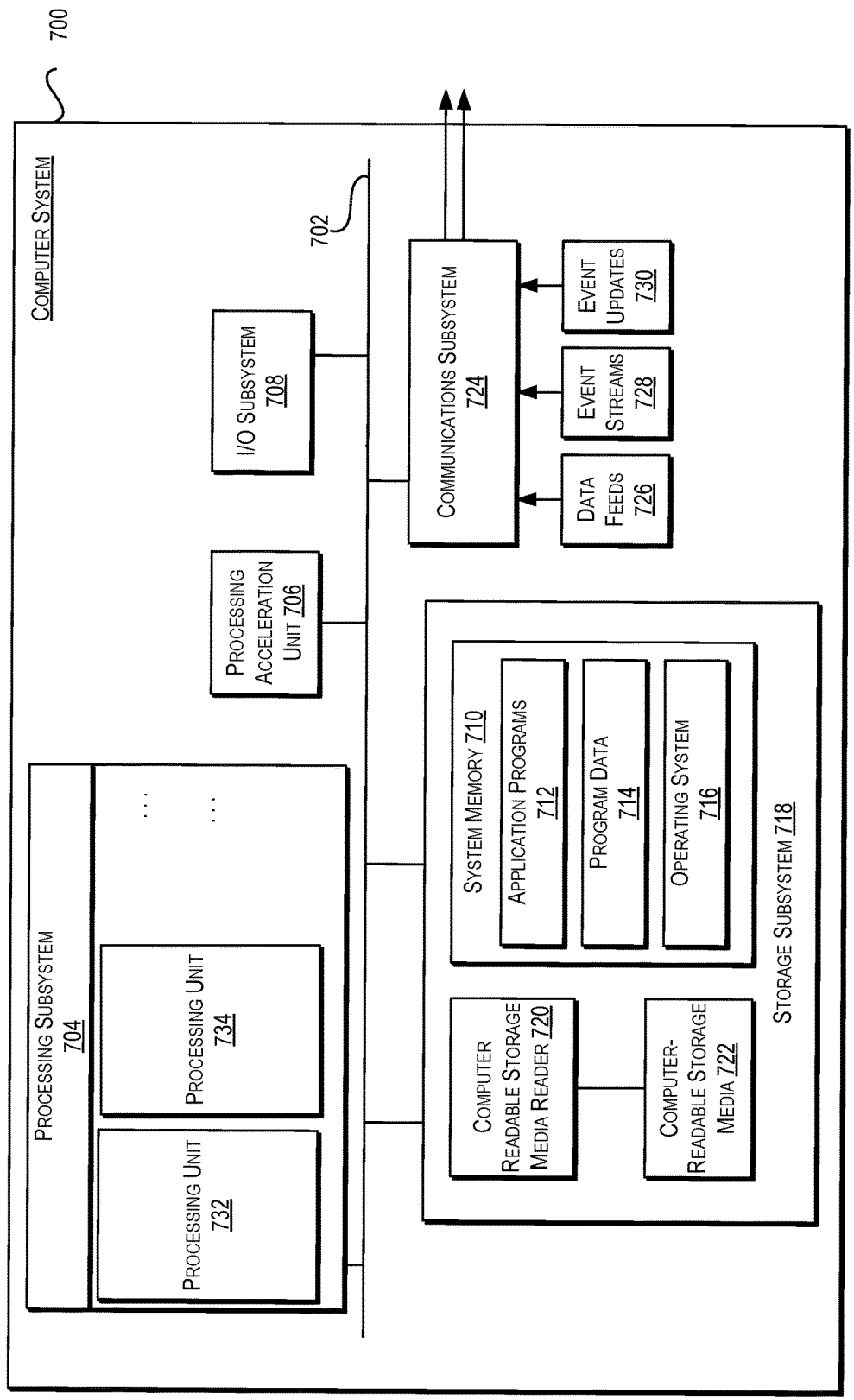
FIG. 7 illustrates an exemplary computer system that may be used to implement certain embodiments.

FIG. 7 illustrates an exemplary computer system 700 that may be used to implement certain embodiments. For example, in some embodiments, computer system 700 may be used to implement any of the application system, storage controller system, systems within a data center, and various servers and computer systems described above. As shown in FIG. 7, computer system 700 includes various subsystems including a processing subsystem 704 that communicates with a number of other subsystems via a bus subsystem 702. These other subsystems may include a processing acceleration unit 706, an I/O subsystem 708, a storage subsystem 718, and a communications subsystem 724. Storage subsystem 718 may include non-transitory computer-readable storage media including storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 704 controls the operation of computer system 700 and may comprise one or more processors, application specific integrated circuits (ASICs), or field programmable gate arrays (FPGAs). The processors may include be single core or multicore processors. The processing resources of computer system 700 can be organized into one or more processing units 732, 734, etc. A processing unit may include one or more processors, one or more cores from the same or different processors, a combination of cores and processors, or other combinations of cores and processors. In some embodiments, processing subsystem 704 can include one or more special purpose co-processors such as graphics processors, digital signal processors (DSPs), or the like. In some embodiments, some or all of the processing units of processing subsystem 704 can be implemented using customized circuits, such as application specific integrated circuits (ASICs), or field programmable gate arrays (FPGAs).

In some embodiments, the processing units in processing subsystem 704 can execute instructions stored in system memory 710 or on computer readable storage media 722. In various embodiments, the processing units can execute a variety of programs or code instructions and can maintain multiple concurrently executing programs or processes. At any given time, some or all of the program code to be executed can be resident in system memory 710 and/or on computer-readable storage media 722 including potentially on one or more storage devices. Through suitable programming, processing subsystem 704 can provide various functionalities described above. In instances where computer system 700 is executing one or more virtual machines, one or more processing units may be allocated to each virtual machine.

In certain embodiments, a processing acceleration unit 706 may optionally be provided for performing customized processing or for off-loading some of the processing performed by processing subsystem 704 so as to accelerate the overall processing performed by computer system 700.

I/O subsystem 708 may include devices and mechanisms for inputting information to computer system 700 and/or for outputting information from or via computer system 700. In general, use of the term input device is intended to include all possible types of devices and mechanisms for inputting information to computer system 700. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 700 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 718 provides a repository or data store for storing information and data that is used by computer system 700. Storage subsystem 718 provides a tangible non-transitory computer-readable storage medium for storing the basic programming and data constructs that provide the functionality of some embodiments. Storage subsystem 718 may store software (e.g., programs, code modules, instructions) that when executed by processing subsystem 704 provides the functionality described above. The software may be executed by one or more processing units of processing subsystem 704. Storage subsystem 718 may also provide a repository for storing data used in accordance with the teachings of this disclosure.

Storage subsystem 718 may include one or more non-transitory memory devices, including volatile and non-volatile memory devices. As shown in FIG. 7, storage subsystem 718 includes a system memory 710 and a computer-readable storage media 722. System memory 710 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 700, such as during start-up, may typically be stored in the ROM. The RAM typically contains data and/or program modules that are presently being operated and executed by processing subsystem 704. In some implementations, system memory 710 may include multiple different types of memory, such as static random access memory (SRAM), dynamic random access memory (DRAM), and the like.

By way of example, and not limitation, as depicted in FIG. 7, system memory 710 may load application programs 712 that are being executed, which may include various applications such as Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 722 may store programming and data constructs that provide the functionality of some embodiments. Computer-readable media 722 may provide storage of computer-readable instructions, data structures, program modules, and other data for computer system 700. Software (programs, code modules, instructions) that, when executed by processing subsystem 704 provides the functionality described above, may be stored in storage subsystem 718. By way of example, computer-readable storage media 722 may include non-volatile memory such as a hard disk drive, a magnetic disk drive, an optical disk drive such as a CD ROM, DVD, a Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 718 may also include a computer-readable storage media reader 720 that can further be connected to computer-readable storage media 722. Reader 720 may receive and be configured to read data from a memory device such as a disk, a flash drive, etc.

In certain embodiments, computer system 700 may support virtualization technologies, including but not limited to virtualization of processing and memory resources. For example, computer system 700 may provide support for executing one or more virtual machines. In certain embodiments, computer system 700 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 700. Accordingly, multiple operating systems may potentially be run concurrently by computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to establish a communication channel to one or more client devices via the Internet for receiving and sending information from and to the client devices. For example, when computer system 700 is used to implement storage controller system 106 depicted in FIG. 1, the communication subsystem may be used to communicate with an application system and also a system executing a storage virtual machine selected for an application.

Communication subsystem 724 may support both wired and/or wireless communication protocols. For example, in certain embodiments, communications subsystem 724 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

Communication subsystem 724 can receive and transmit data in various forms. For example, in some embodiments, in addition to other forms, communications subsystem 724 may receive input communications in the form of structured and/or unstructured data feeds 726, event streams 728, event updates 730, and the like. For example, communications subsystem 724 may be configured to receive (or send) data feeds 726 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 724 may be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to communicate data from computer system 700 to other computer systems or networks. The data may be communicated in various different forms such as structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 700 depicted in FIG. 7 is intended only as a specific example. Many other configurations having more or fewer components than the system depicted in FIG. 7 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   receiving, at a storage controller system, application storage profile information for an application, the application storage profile information identifying a set of storage-related requirements for the application;
   generating, by the storage controller system, an application identifier for the application;
   identifying for the application, by the storage controller system, from a plurality of virtual machines, a first virtual machine for servicing a storage request generated by the application during execution of the application, the identifying comprising determining that the first virtual machine is capable of supporting the set of storage-related requirements identified in the application storage profile information;
   communicating, by the storage controller system, the application identifier and information identifying the first virtual machine to an application system that is configured to execute the application for enabling the application system to communicate a storage request generated by the application to the first virtual machine;
   communicating, by the storage controller system, the application identifier and the application storage profile information to the first virtual machine for enabling the first virtual machine to service the storage request generated by the application;
   storing, at the storage controller system, information associating the application identifier with the application storage profile information and the identified virtual machine.

2. The method of claim 1 wherein the identifying comprises:
   determining, by the storage controller system, that the set of storage-related requirements includes a first storage-related requirement identifying a particular type of storage device; and
   determining, by the storage controller system, that the first virtual machine is capable of supporting the particular type of storage device.

3. The method of claim 1 wherein the identifying comprises:
   determining, by the storage controller system, that the set of storage-related requirements includes one or more storage-related requirements, the one or more storage-related requirements identifying one or more storage-related features for the application; and
   determining, by the storage controller system, that the first virtual machine is capable of supporting the one or more storage-related features.

4. The method of claim 3 wherein the one or more storage-related features include a feature related to caching, replication, compression, or deduplication.

5. The method of claim 3 wherein the one or more storage-related features include a feature related to coalescing writes, an optimization for key-value pairs, an object-store optimization, or an optimization for a database.

6. The method of claim 1 further comprising determining, by the storage controller system, a geographical location of the application system; and wherein the identifying comprises:
  determining, by the storage controller system, from the plurality of virtual machines, multiple virtual machines that are capable of providing the set of storage-related requirements for the application, the multiple virtual machines including the first virtual machine;
  determining, by the storage controller system, a geographical location for each of the virtual machines in the multiple virtual machines; and
  determining, by the storage controller system, that, from among the multiple virtual machines, the first virtual machine is geographically closest to the geographical location of the application system.

7. The method of claim 1 further comprising:
executing the application by the application system;
generating a storage request by the application, the storage request including the application identifier; and
communicating, by the application system, the storage request to the first virtual machine.

8. The method of claim 7 further comprising:
receiving, by the first virtual machine, the storage request from the application system; and
determining, by the first virtual machine, the set of storage-related requirements for the application using the application identifier in the storage request; and
servicing, by the first virtual machine, the storage request according to the set of storage-related requirements determined using the application identifier.

9. A method comprising:
receiving, by an application system, from a storage controller system, an application identifier and information identifying a first virtual machine, the application identifier generated by the storage controller system for an application, the first virtual machine selected by the storage controller system for servicing the application based upon application storage profile information received by the storage controller system, the application storage profile information identifying a set of storage-related requirements for the application;
determining, by the application system, the application identifier included in a storage request generated by the application executing on the application system, the storage request generated by the application after the receiving;
determining, by the application system, based upon the information identifying the first virtual machine received by the application system for the application prior to the generation of the storage request, the first virtual machine corresponding to the application identifier; and
communicating, by the application system, the storage request to the first virtual machine for servicing of the storage request by the first virtual machine according to the set of storage-related requirements specified for the application.

10. The method of claim 9 further comprising receiving the storage request by an operating system executed by the application system; and
  wherein determining the application identifier included in the storage request comprises determining, by the operating system, the application identifier from the storage request;
  wherein determining the first virtual machine comprises determining, by the operating system, the first virtual machine corresponding to the application identifier; and
  wherein the communicating comprises causing, by the operating system, the storage request to be routed to the first virtual machine.

11. The method of claim 9 further comprising:
receiving, by the first virtual machine, the storage request from the application system;
determining, by the first virtual machine, the set of storage-related requirements for the application using the application identifier in the storage request; and
servicing, by the first virtual machine, the storage request according to the set of storage-related requirements.

12. The method of claim 11 further comprising:
prior to the generation of the storage request by the application executed by the application system, receiving, by the first virtual machine, from the storage controller system, the application identifier and information identifying the set of storage-related requirements for the application.

13. The method of claim 9 further comprising:
receiving, at the storage controller system, the application storage profile information for the application;
generating, by the storage controller system, the application identifier for the application;
identifying for the application, by the storage controller system, from a plurality of virtual machines, the first virtual machine that is capable of supporting the set of storage-related requirements identified in the application storage profile information;
communicating, by the storage controller system, the application identifier and information identifying the first virtual machine to the application system; and
communicating, by the storage controller system, the application identifier and the application storage profile information to the first virtual machine.

14. A non-transitory computer-readable memory storing a plurality of instructions executable by one or more processors, the plurality of instructions comprising instructions that cause a storage controller system to:
  generate an application identifier for an application corresponding to application storage profile information received by the storage controller system, the application storage profile information identifying a set of storage-related requirements for the application;
  identify for the application, from a plurality of virtual machines, a first virtual machine for servicing a storage request generated by the application during execution of the application, the identification comprising determining that the first virtual machine is capable of supporting the set of storage-related requirements identified in the application storage profile information;
  communicate the application identifier and information identifying the first virtual machine to an application system that is configured to execute the application;
  communicate the application identifier and the application storage profile information to the first virtual machine; and
  store, at the storage controller system, information associating the application identifier with the application storage profile information and the identified virtual machine.

15. The non-transitory computer-readable memory of claim 14 wherein the instructions that cause the storage controller system to identify the first virtual machine for the application further comprise instructions that cause the storage controller system to:

determine that the set of storage-related requirements includes a first storage-related requirement identifying a particular type of storage device; and
determine that the first virtual machine is capable of supporting the particular type of storage device.

16. The non-transitory computer-readable memory of claim 14 wherein the instructions that cause the storage controller system to identify the first virtual machine for the application further comprise instructions that cause the storage controller system to:
determine that the set of storage-related requirements includes one or more storage-related requirements, the one or more storage-related requirements identifying one or more storage-related features for the application; and
determine that the first virtual machine is capable of supporting the one or more storage-related features.

17. The non-transitory computer-readable memory of claim 14 wherein:
the plurality of instructions further comprises instructions that cause the storage controller system to determine a geographical location of the application system; and
the instructions that cause the storage controller system to identify the first virtual machine for the application further comprise instructions that cause the storage controller system to:
determine, from the plurality of virtual machines, multiple virtual machines that are capable of providing the set of storage-related requirements for the application, the multiple virtual machines including the first virtual machine;
determine a geographical location for each of the virtual machines in the multiple virtual machines; and
determine that, from among the multiple virtual machines, the first virtual machine is geographically closest to the geographical location of the application system.

18. The non-transitory computer-readable memory of claim 14 wherein the plurality of instructions further comprises instructions that cause the application system to:
execute the application;
receive a storage request generated by the application, the storage request including the application identifier; and
communicate the storage request to the first virtual machine.

19. The non-transitory computer-readable memory of claim 18 wherein the plurality of instructions further comprises instructions that cause the first virtual machine to:
determine the set of storage-related requirements for the application using the application identifier in the storage request received from the application system; and
service the storage request according to the set of storage-related requirements determined using the application identifier.

* * * * *

UNITED STATES PATENT AND TRADEMARK OFFICE
CERTIFICATE OF CORRECTION

PATENT NO.       : 10,223,024 B2
APPLICATION NO.  : 15/291506
DATED            : March 5, 2019
INVENTOR(S)      : Sharma Page 1 of 1

It is certified that error appears in the above-identified patent and that said Letters Patent is hereby corrected as shown below:

In the Specification

In Column 2, Line 56, delete "machine" and insert -- machine. --, therefor.

Signed and Sealed this
Third Day of March, 2020

Andrei Iancu
*Director of the United States Patent and Trademark Office*